(12) United States Patent
Kamijima

(10) Patent No.: US 8,874,944 B2
(45) Date of Patent: Oct. 28, 2014

(54) COMMUNICATION DEVICE

(75) Inventor: Kyoichi Kamijima, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 790 days.

(21) Appl. No.: 13/097,008

(22) Filed: Apr. 28, 2011

(65) Prior Publication Data
US 2011/0276814 A1 Nov. 10, 2011

(30) Foreign Application Priority Data

May 6, 2010 (JP) ................................. 2010-106393

(51) Int. Cl.
G06F 1/32 (2006.01)
G06F 3/12 (2006.01)
H04L 12/28 (2006.01)
H04L 29/12 (2006.01)

(52) U.S. Cl.
CPC ............ G06F 1/3203 (2013.01); G06F 1/3284 (2013.01); H04L 29/12226 (2013.01); H04L 61/2015 (2013.01); Y02B 60/1267 (2013.01)
USPC ........... 713/320; 713/321; 713/322; 713/323; 713/324; 358/1.15; 370/255; 370/256

(58) Field of Classification Search
None
See application file for complete search history.

(56) References Cited

U.S. PATENT DOCUMENTS

| 6,286,038 | B1* | 9/2001 | Reichmeyer et al. | 709/220 |
| 6,373,826 | B1* | 4/2002 | Russell et al. | 370/256 |
| 8,345,291 | B2 | 1/2013 | Hosogoshi | |
| 2006/0072460 | A1* | 4/2006 | Fukui et al. | 370/235 |
| 2008/0133950 | A1 | 6/2008 | Kawaji | |
| 2011/0276814 | A1* | 11/2011 | Kamijima | 713/320 |

FOREIGN PATENT DOCUMENTS

JP 2008-139932 6/2008
JP 2010-263551 A 11/2010

* cited by examiner

Primary Examiner — Tanh Nguyen
(74) Attorney, Agent, or Firm — Maschoff Brennan

(57) ABSTRACT

Provided is a communication device connected to a network access device constituting a network and capable of communication through the network, includes: a circumstance determining unit that determines whether or not the network is in a circumstance of executing a protocol causing blocking of communication on the network by changing the link speed to the network access device; a power saving determining unit that determines whether or not a predetermined power saving performance condition is satisfied; and a link speed control unit that maintains the link speed when it is determined that the power saving performance condition is satisfied and when the network is in the circumstance of executing the protocol.

8 Claims, 5 Drawing Sheets

FIG. 3

| SET LINK SPEED OF PRINTER (SELF DEVICE) | SET LINK SPEED OF SWITCH | LINK SPEED AT TIME OF POWER SAVING MODE |
|---|---|---|
| AUTO (100 Mbps) | AUTO (100 Mbps) | HALF FIXING OF 10 Mbps |
| AUTO (100 Mbps) | AUTO (1000 Mbps) | HALF FIXING OF 10 Mbps |
| AUTO (1000 Mbps) | AUTO (100 Mbps) | HALF FIXING OF 10 Mbps |
| AUTO (1000 Mbps) | AUTO (1000 Mbps) | HALF FIXING OF 10 Mbps |

COMMUNICATION DEVICE

BACKGROUND

1. Technical Field

The present invention relates to a communication device which is connected to a network access device constituting a network and is capable of communicating through the network.

2. Related Art

Communication through a network can be performed by connecting a communication device such as a PC (Personal Computer) and a printer to a network access device (switch, bridge, router, etc.) on the network.

In recent years, power saving is demanded for the communication device. For example, as a technique for power savings in the communication device, a technique of lowering the communication speed (link speed) to the network access device to reduce power consumption is known (e.g., see JP-4275169).

As a protocol applied to the network, STP (Spanning Tree Protocol), which is a protocol for allowing a LAN (Local Area Network) including a loop to be logically operable as a tree type network, is known.

According to the technique of Japanese Patent No. 4,275,169, it is possible to reduce power consumption in the communication device by lowering the link speed (communication speed) to the network access device.

However, according to the kind of STP applied to the network, when the link speed between the communication device and the network access device is changed, there is a case where a process of learning the structure of a spanning tree is performed according to STP, and a state where communication on the network is blocked occurs, for example, for 30 seconds.

When such blocking of communication occurs, communication is not performed for the communication device connected to the network, a communication error occurs, and the process may not be appropriately performed.

SUMMARY

An advantage of some aspects of the invention is to provide a technique capable of appropriately preventing a communication error on a network.

According to an advantage of some aspects of the invention, there is provided a communication device connected to a network access device constituting a network and capable of communication through the network, including: a circumstance determining unit that determines whether or not the network is in a circumstance of executing a protocol causing blocking of communication on the network by changing the link speed to the network access device; a power saving determining unit that determines whether or not a predetermined power saving performance condition is satisfied; and a link speed control unit that maintains the link speed when it is determined that the power saving performance condition is satisfied and when the network is in the circumstance of executing the protocol.

According to the communication device, when the network is in the circumstance of executing the protocol causing a blocking of communication on the network due to changing the link speed to the network access device, the link speed is maintained even when the power saving performance condition is satisfied. Accordingly, it is possible to appropriately prevent the communication from being blocked due to a change in the link speed.

In the communication device, it is preferable that the circumstance determining unit determines whether or not the network is in the circumstance of executing the protocol causing blocking of communication on the network due to changing the link speed to the network access device on the basis of a time until receiving a response from a DHCP (Dynamic Host Configuration Protocol) server after accessing the network. According to the communication device, it is possible to appropriately determine whether or not the protocol causing block of communication is being executed by determining whether or not the communication is actually blocked on the basis of the communication with the DHCP server.

In the communication device, it is preferable that the circumstance determining unit determines that the network is in the circumstance of executing the protocol causing blocking of communication on the network due to changing the link speed to the network access device when the time until the response is received is received from the DHCP server is longer than 30 seconds. According to the communication device, it is possible to appropriately determine whether or not the protocol causing blocking of communication is executed by more appropriately determining whether or not the blocking of communication occurs according to the response from the DHCP server.

In the communication device, it is preferable that the link speed control unit lowers the link speed when the power saving performance condition is satisfied and when the network is not in the circumstance of executing the protocol. According to the communication device, when the power saving performance condition is satisfied, the link speed is lowered in the case of the protocol which does not cause blocking of communication even when the link speed is changed. Accordingly, it is possible to improve the power saving effect in the communication device.

In the communication device, it is preferable that the link speed control unit lowers the link speed to the lowest link speed of the available link speeds in the network access device. According to the communication device, since the link speed is lowered to the lowest link speed, it is possible to effectively improve the power saving effect in the communication device.

The communication device may further include a release determining unit that determines whether or not a situation coinciding with a predetermined power saving release condition occurs, and the link speed control unit may raise the lowered link speed when it is determined that the situation coinciding with the power saving release condition occurs. According to the communication device, since the lowered link speed is raised when the power saving release condition is satisfied, it is possible to perform communication at the appropriate link speed.

In the communication device, it is preferable that the protocol is STP (Spanning Tree Protocol). According to the communication device, it is possible to appropriately cause the blocking of communication to not occur on the network to which the STP is applied.

According to a second aspect of the invention, there is provided a communication control method of a communication device connected to a network access device constituting a network and capable of communication through the network, including: determining whether or not the network is in a circumstance of executing a protocol causing blocking of communication on the network by changing the link speed to the network access device; determining whether or not a predetermined power saving performance condition is satisfied; and maintaining the link speed when it is determined that the power saving performance condition is satisfied and when the network is in the circumstance of executing the protocol.

According to the communication control method, when the network is in the circumstance of executing the protocol causing blocking of communication on the network due to changing the link speed to the network access device, the link speed is maintained even when the power saving performance condition is satisfied. Accordingly, it is possible to appropriately prevent communication from being blocked due to a change in the link speed.

BRIEF DESCRIPTION OF THE DRAWINGS

The invention will be described with reference to the accompanying drawings, wherein like numbers reference like elements.

FIG. 3 is a diagram illustrating a change in link speed according to an embodiment of the invention.

DESCRIPTION OF EXEMPLARY EMBODIMENTS

An embodiment of the invention will be described with reference to the drawings. The embodiment described hereinafter does not limit the invention according to the above-described aspects and all the elements and compositions described in the embodiment are not essential for the resolution means.

First, a network system according to an embodiment of the invention will be described.

Figure 1:
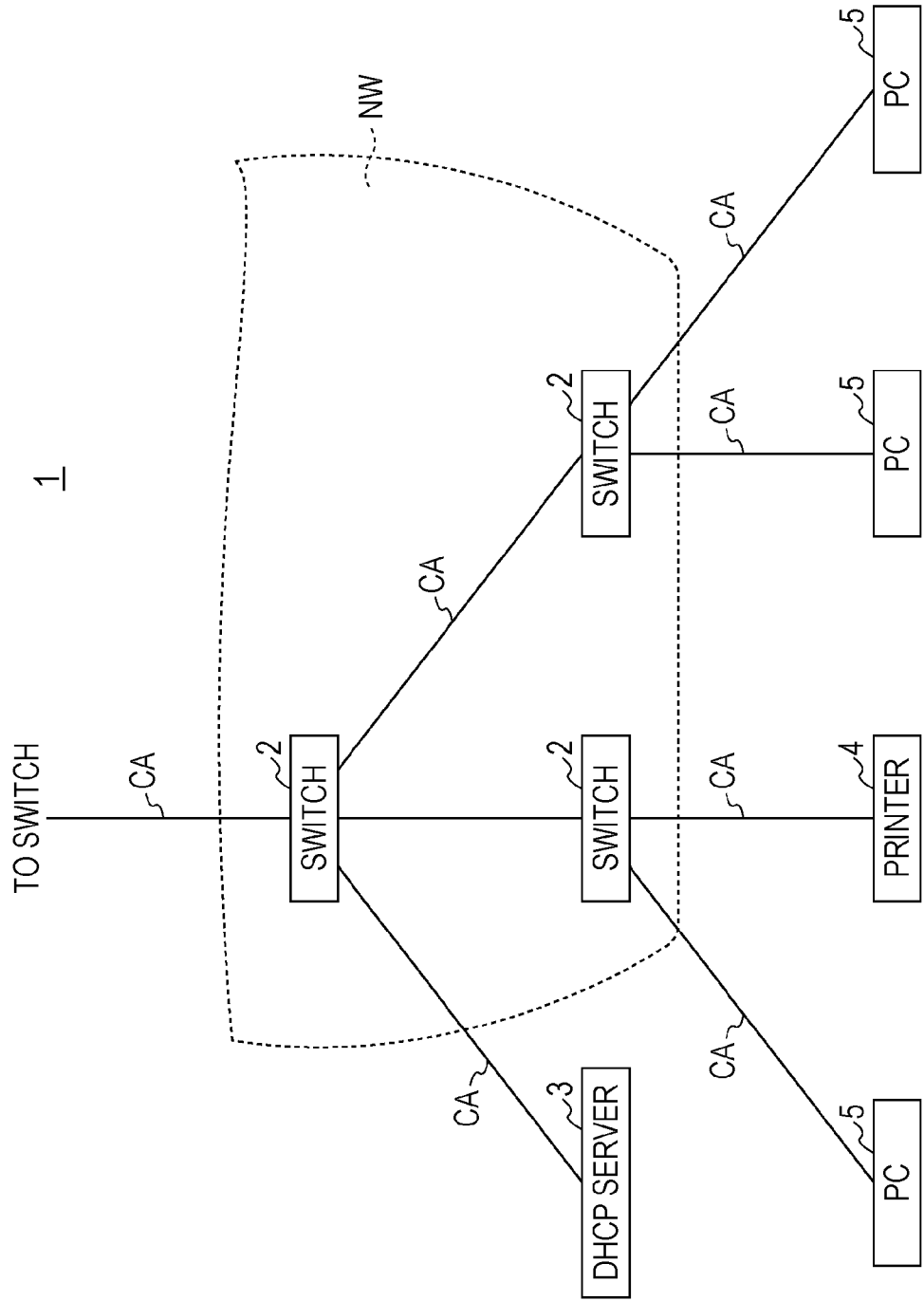
FIG. 1 is a diagram illustrating an example of a partial configuration of a network system according to an embodiment of the invention.

FIG. 1 is a diagram illustrating an example of a partial configuration of a network system according to an embodiment of the invention.

In the network system 1, a network NW is configured by a switch 2 as an example of one or more network access devices, and a network cable CA connecting the switch 2 to the other network access device. A line connecting the switch 2 to the other network access device may be wireless. The network access device is not limited to the switch 2, and may be a bridge or a router. The main point is, a device in which the address of a transmission source device and a port are associated and stored when receiving a communication frame, the device having a function of transmitting the communication frame in the port which can be associated with the address of a destination device of the communication frame when receiving the communication frame, is preferable.

For example, when the network NW is in a circumstance of executing STP (Spanning Tree Protocol), all the switches 2 may have a function of executing STP. On the network NW in the circumstance of executing STP, when a new link occurs in the port of the switch 2 (a new device is connected to the port, or the link speed to the communication device connected to the port is changed), a process is performed for learning a spanning tree by the switch 2 of the network NW. At the time of executing the process of learning the spanning tree, a situation in which communication other than the communication related to the STP is blocked occurs over some time (e.g., a time longer than 30 seconds).

In the network system 1, the switch 2 constituting the network NW is connected to communication devices such as a DHCP (Dynamic Host Configuration Protocol) server 3, a printer 4, and a PC 5 through the network cable CA. The means for connecting the switch 2 and the communication device is not limited to the network cable CA, and they may be connected by wireless.

The DHCP server 3 assigns information (e.g., IP address) necessary to be set in the communication device of a request source in response to a request from the communication device connected to the network NW. The PC 5 transmits various kinds of information through the network NW. For example, PC 5 transmits a printing request (printing data) to the printer 4 through the network NW.

Figure 2:
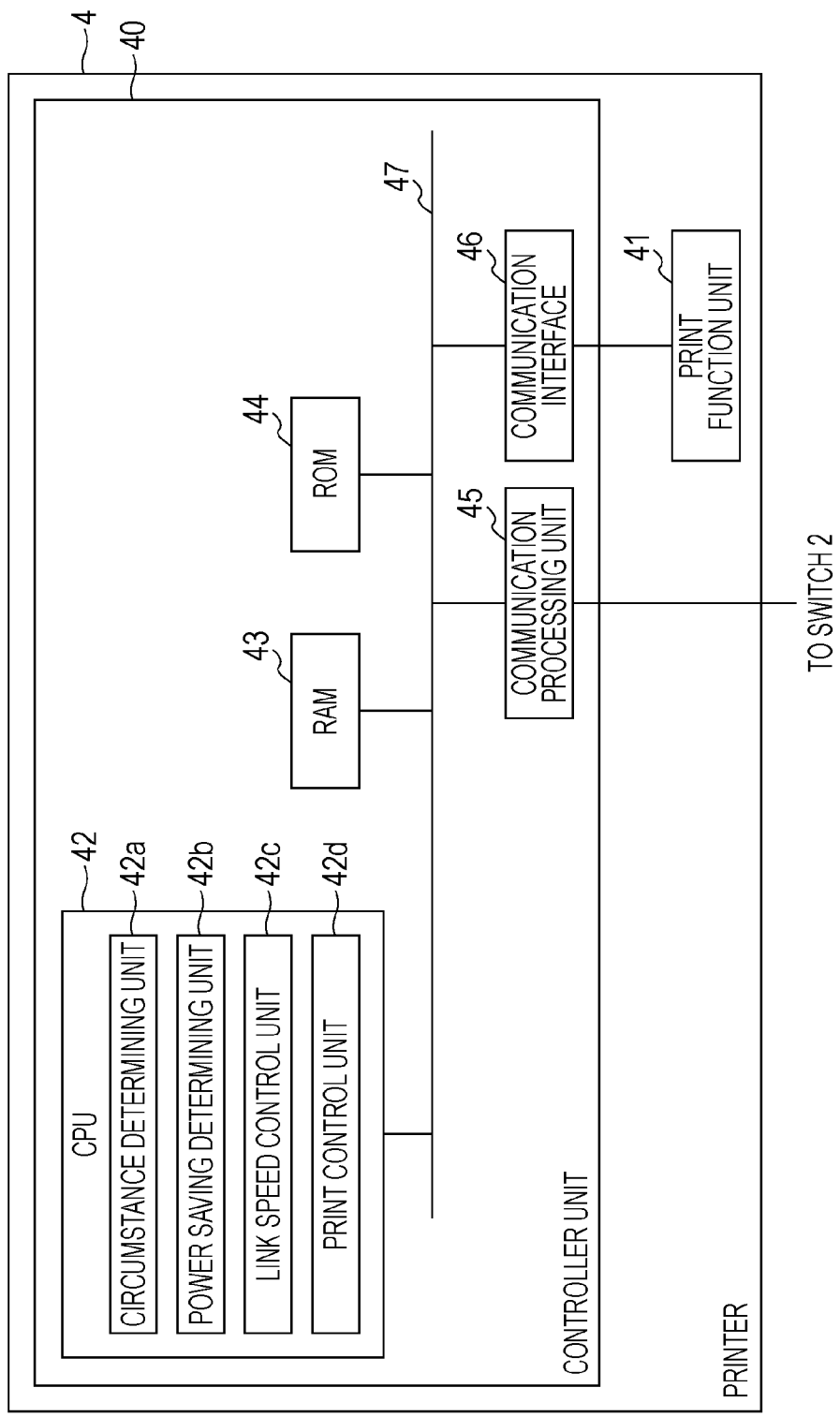
FIG. 2 is a diagram illustrating a functional configuration of a printer according to an embodiment of the invention.

FIG. 2 is a diagram illustrating a functional configuration of the printer according to the embodiment of the invention.

The printer 4 mainly includes a controller unit 40, and a print function unit 41. The print function unit 41 forms an image on a predetermined image forming medium (paper, OHP, sheet, etc.) on the basis of a control of the controller unit 40. The controller unit 40 includes a CPU (Central Processing Unit) 42, a RAM (Random Access Memory) 43, a ROM (Read Only memory) 44, a communication processing unit 45, a communication interface 46, and a bus 47 connecting them to each other.

The RAM 43 is used as an area for storing programs and data, or used as a work area for storing data used in a process performed by the CPU 42. The ROM 44 stores a boot program and programs of various processes performed by CPU 42.

The communication processing unit 45 transmits a communication packet received from the CPU 42, to the switch 2. The communication processing unit 45 receives the communication packet received from the switch 2, and transmits the communication packet to the CPU 42. In the embodiment, the communication processing unit 45 can change a communication speed (link speed) to the switch 2 according to a control of a link speed control unit 42c to be described later. That is, the communication processing unit 45 first cuts off the access up to that point, and then reconnects at the changed link speed, thereby changing the link speed. In the communication processing unit 45, it is possible to suppress the performance necessary for the process and to reduce power consumption, by as much as the link speed is lowered. The communication interface 46 intermediates communication between the CPU 42 and the print function unit 41.

The CPU 42 includes a circumstance determining unit 42a as an example of circumstance determining means, a power saving determining unit 42b as an example of power saving determining means, a link speed control unit 42c as an example of link speed control means, and a print control unit 42d.

The circumstance determining unit 42a performs communication with the DHCP server 3 of the connected network NW to perform communication setting (setting of IP address) of the printer 4 on the basis of information (e.g., IP address) which can be assigned from the DHCP server 3. When the DHCP server 3 is not connected to the network NW (does not exist), the circumstance determining unit 42a sets the IP address by APIPA (Automatic Private IP Addressing).

The circumstance determining unit 42a determines whether or not the connected network NW is in a circumstance of executing a protocol (e.g., STP) causing blocking of communication on the network NW due to changing the link speed to the switch 2, and stores the determination result in the RAM 43.

As described above, the change of the link speed is performed in a manner of first cutting off the access up to that point and then reconnecting at the changed link speed. For this reason, in the circumstance of executing the STP, when the link speed is changed, the switch 2 such as a router detecting re-access from the printer 4 performs a process of learning the spanning tree structure, thereby blocking communication on the network.

In the embodiment, an STP circumstance flag indicating whether or not the circumstance is a circumstance of executing the protocol causing blocking of communication on the network NW due to changing the link speed to the switch 2 is used as the determination result. In the embodiment, in the case of the circumstance of executing the protocol causing blocking, the STP circumstance flag is set to ON (e.g., "1"), otherwise the STP circumstance flag is set to OFF (e.g., "0").

In the embodiment, the circumstance determining unit 42a determines whether or not the network NW is in the circumstance of executing the protocol (protocol causing blocking of communication due to a change in the link speed) causing blocking of communication on the network NW due to changing the link speed of the switch 2 on the basis of the time until a response is received from the DHCP server 3, after the printer 4 is electrically connected to the network NW (electrically connected to the switch 2, for example, in a state where the printer 4 is physically connected to the switch 2, powering on the printer 4). More specifically, the circumstance determining unit 42a determines that the network NW is in the circumstance of executing the protocol causing blocking of communication on the network NW due to changing the link speed to the switch 2, when the time until the response is received from the DHCP server 3 is longer than a predetermined time (e.g., 30 seconds). In the embodiment, when the response is not received from the DHCP server 3, it cannot be determined whether or not the network NW is in the circumstance of executing the protocol causing blocking of communication on the network NW due to changing the link speed to the switch 2. However, since it may be in the circumstance of executing the protocol, in the embodiment in order to prevent communication from being blocked, if it is in the circumstances where the protocol is executed is determined. Accordingly, in the embodiment, when the time until the response is received from the DHCP server is within a predetermined time (e.g., 30 seconds), the circumstance determining unit 42a determines that the network NW is not in the circumstance of executing the protocol causing blocking of communication due to changing the link speed, otherwise, determines that the network NW is in the circumstance of executing the protocol causing blocking of communication.

The power saving determining unit 42b determines whether or not a predetermined power saving performance condition is satisfied. As the power saving performance condition, for example, there is a case where the printer 4 does not receive printing data from an external device during a predetermined time or more. The power saving determining unit 42b determines whether or not a predetermined power saving release condition is satisfied. As the power saving release condition, there is a case where the printer 4 receives printing data from an external device.

When the power saving determining unit 42b determines that the predetermined power saving performance condition is satisfied and the determination result of the circumstance determining unit 42a is the determination result that the network NW is in the circumstance of executing the protocol causing blocking of communication due to changing the link speed, the link speed control unit 42c maintains the present link speed without changing the link speed since the blocking of communication on the network NW occurs when the link speed is changed. Meanwhile, when the power saving determining unit 42b determines that the predetermined power saving performance condition is satisfied and the determination result of the circumstance determining unit 42a is the determination result that the network NW is not in the circumstance of executing the protocol causing blocking of communication due to changing the link speed, the link speed control unit 42c determines whether or not the link speed between the communication processing unit 45 and the switch 2 can be lowered and performs a control of lowering the link speed between the communication processing unit 45 and the switch 2 when the link speed can be lowered. The lowered speed may be the lowest link speed which is available between the communication processing unit 45 and the switch 2.

FIG. 3 is a diagram illustrating the change of the link speed according to the embodiment of the invention.

For example, as shown in FIG. 3, when the link speed settings in the device (printer 4) is automatic setting to 100 Mbps and the link speed settings of the connected switch 2 is automatic setting to 1000 Mbps or automatic setting to 100 Mbps, the link speed is generally set to 100 Mbps and the link speed can be lowered. Accordingly, the link speed control unit 42c sets the link speed, for example, to half (half duplex communication) fixing of 10 Mbps that is the lowest link speed. As shown in FIG. 3, when the link speed settings in the device (printer 4) is automatic setting to 1000 Mbps and the link speed settings of the connected switch 2 is automatic setting to 1000 Mbps or automatic setting to 100 Mbps, the link speed is generally set to 1000 Mbps or 100 Mbps and the link speed can be lowered. Accordingly, the link speed control unit 42c sets the link speed, for example, to half (half duplex communication) fixing of 10 Mbps. The link speed settings of the switch 2 can be may be caught on the basis of information (Auto-Negotiation Bit) set in the internal memory of the communication processing unit 45 when the communication processing unit 45 is connected to the switch 2.

Returning to the description of FIG. 2, when the power saving determining unit 42b determines that the predetermined power saving release condition is satisfied after the link speed is lowered, the link speed control unit 42c performs a control of raising the link speed (e.g., returns to the original setting) between the communication processing unit 45 and the switch 2.

The print control unit 42d controls the print function unit 41 to form a predetermined image on an image forming medium according to the printing data received through switch 2 by the communication processing unit 45.

Next, a process operation in the network system according to the embodiment of the invention will be described.

Figure 4:
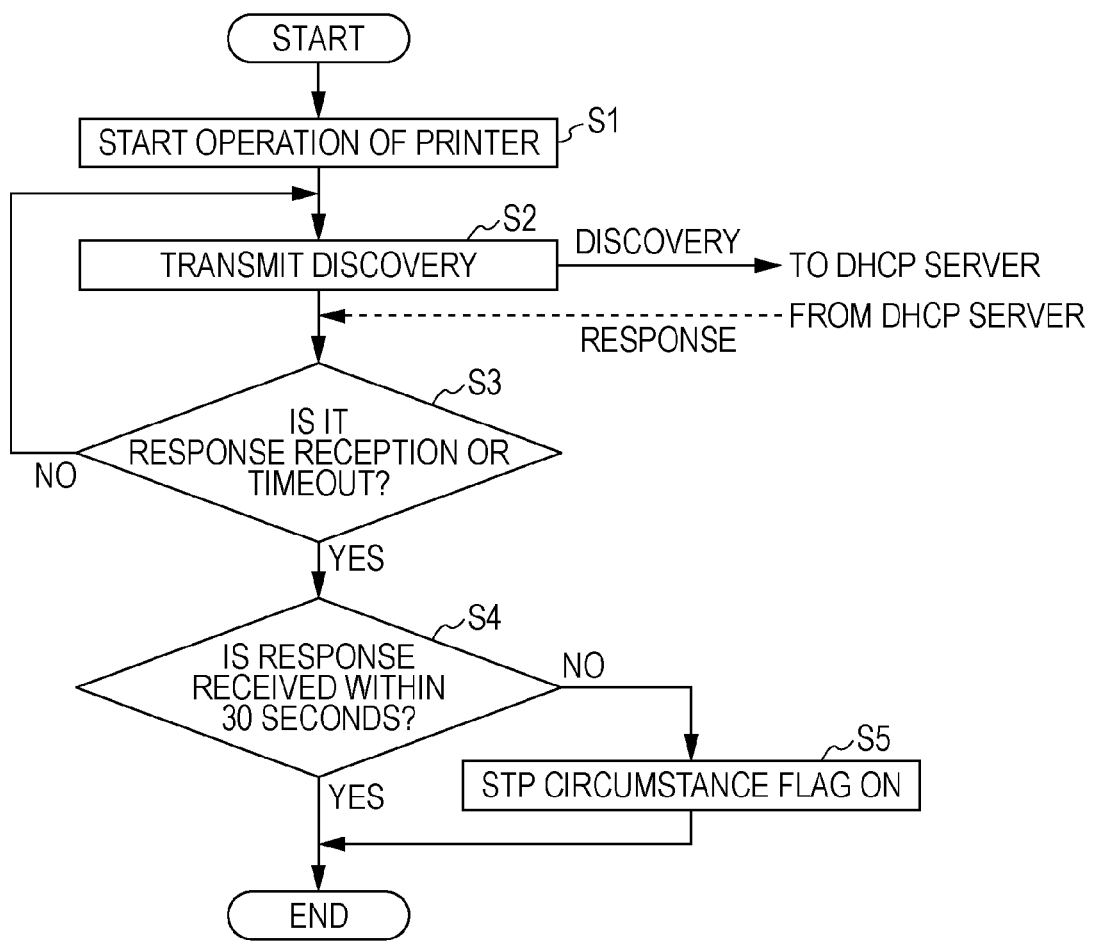
FIG. 4 is a flowchart illustrating a process at the operating time according to an embodiment of the invention.

FIG. 4 is a flowchart illustrating an operating time process according to the embodiment of the invention.

Before the operating time process, it is assumed that the printer 4 is physically connected to the switch 2 through the network cable CA.

First, when the printer 4 is powered on, the printer 4 starts operating (Step S1).

When the operation is started, the communication processing unit 45 starts a communication access (electrical connection) to the switch 2. In this case, when the network NW is in the circumstance of executing the STP, the switch 2 detects that there is a new link on a port, and a process for learning the spanning tree is started by the plurality of switches 2 of the network NW. At the time of the process of learning the spanning tree, a situation in which communication other than the communication related to the STP is blocked occurs over some time (e.g., a time longer than 30 seconds).

After the printer 4 is operated, the circumstance determining unit 42*a* transmits a discovery message for discovering the DHCP server 3 (Step S2). When the DHCP server 3 exists on the network NW and the DHCP server 3 receives the discovery message, the DHCP server 3 transmits a response message (Offer message) for the discovery message to the printer 4. As described above, when the communication on the network NW is blocked, the discover message does not reach the DHCP server 3 and thus the response message does not return to the printer 4.

The circumstance determining unit 42*a* determines whether the response message is received or timeout of transmission of the discovery message is made (e.g., 2 minutes elapse) (Step S3). When it is determined that the response message is received or the timeout is made (Step S3: Yes), the process proceeds to Step S4. When the response message is not received or the timeout is not made (Step S3: No), the processes from Step S2 are repeatedly performed.

In Step S4, the circumstance determining unit 42*a* determines whether or not the response message is received within a predetermined time (within 30 seconds) after the first transmission of the discovery message is started. As a result, when the response message is received within the predetermined time, it means that the network NW is not in the circumstance of executing the STP. Accordingly, nothing is performed and the process is ended.

Meanwhile, the response message is not received within the predetermined time, that is, when the response message is received after a time longer than 30 seconds elapses, or when the response message is not received (i.e., the response message is not received and the timeout is made), it means that the network NW is in the circumstance of executing the STP (or the possibility thereof remains). Accordingly, the STP circumstance flag indicating the circumstance of executing the STP, which is stored in RAM 43, is set to ON (Step S5), and the process is ended.

Next, a communication control process will be described.

Figure 5:
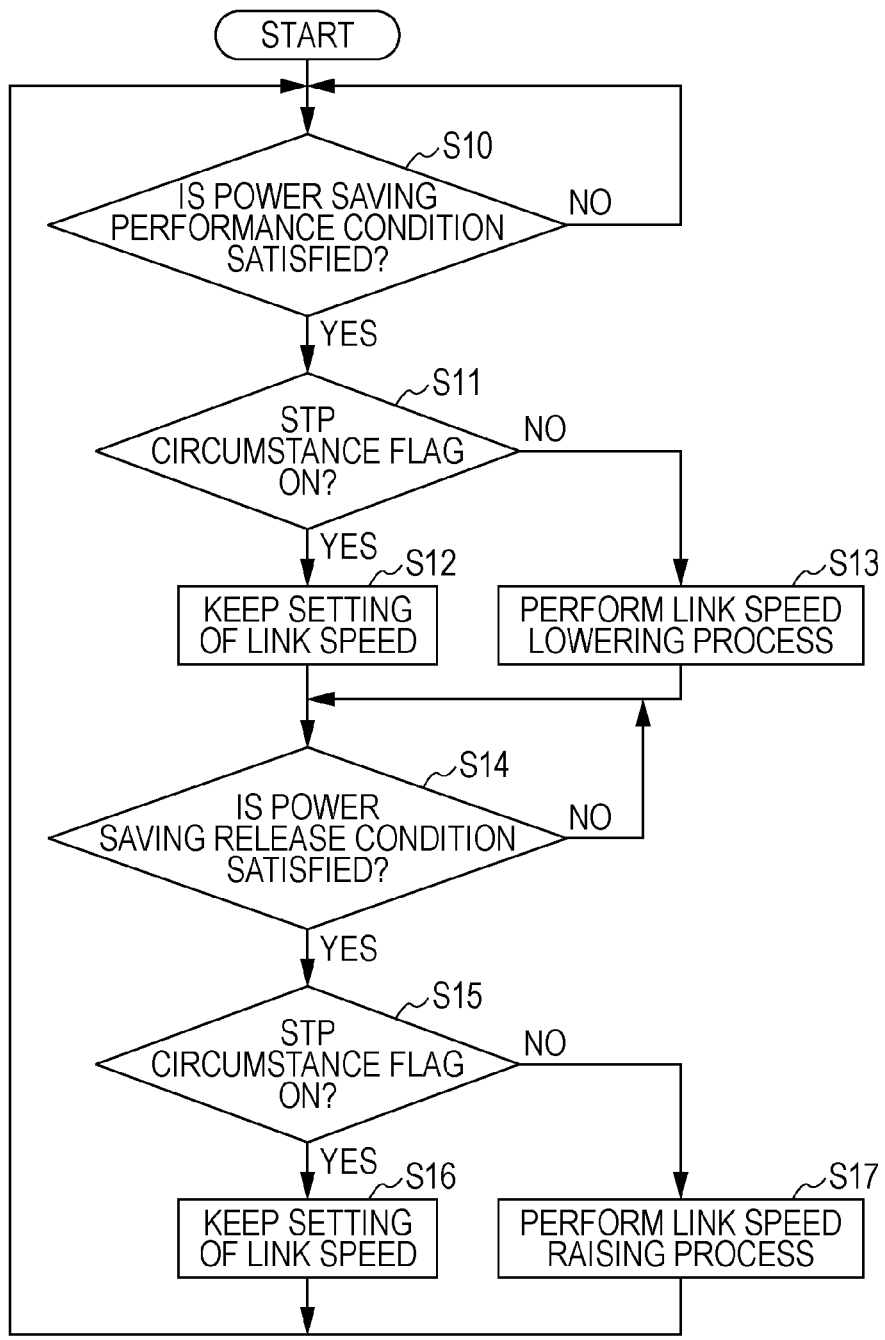
FIG. 5 is a flowchart illustrating a communication control process according to an embodiment of the invention.

FIG. 5 is a flowchart illustrating the communication control process according to the embodiment of the invention.

First, in the printer 4, the power saving determining unit 42*b* determines whether or not a predetermined power saving performance condition is satisfied (Step S10). As a result, when the power saving performance condition is not satisfied (Step S10: No), it waits until the power saving performance condition is satisfied.

Meanwhile, when the power saving performance condition is satisfied (Step S10: Yes), the satisfaction of the power saving performance condition is reported to the link speed control unit 42*c*. The link speed control unit 42*c* determines whether or not the STP circumstance flag of the RAM 43 is ON (Step S11). When the STP circumstance flag is ON (Step S11: Yes), it indicates that the network NW is in the circumstance of executing the STP. Accordingly, the setting is maintained without changing the link speed (Step S12), and the process proceeds to Step S14. In the embodiment, specifically, the link speed control unit 42*c* does nothing and maintains the link speed settings.

Meanwhile, when the STP circumstance flag is not ON (Step S11: No), it indicates that the network NW is not in the circumstance of executing the STP. Accordingly, a process (a link speed lowering process) of lowering the link speed is performed (Step S13), and the process proceeds to Step S14. In the embodiment, in the link speed lowering process, when each link speed setting is the setting capable of lowering the link speed between the printer 4 and the switch 2, the link speed control unit 42*c* lowers the link speed. As described above, by lowering the link speed, it is possible to reduce the power necessary for the communication process performed by the communication processing unit 45.

In Step S14, the power saving determining unit 42*b* determines whether or not a predetermined power saving release condition is satisfied. As a result, when the power saving release condition is not satisfied (Step S14: No), it waits until the power saving release condition is satisfied.

Meanwhile, when the power saving release condition is satisfied (Step S14: Yes), the satisfaction of the power saving release condition is reported to the link speed control unit 42*c*. The link speed control unit 42*c* determines whether or not the STP circumstance flag of the RAM 43 is ON (Step S15). When the STP circumstance flag is ON (Step S15: Yes), it indicates that the network NW is in the circumstance of executing the STP. Accordingly, the setting is maintained without changing the link speed (Step S16), and the process proceeds to Step S10. In the embodiment, specifically, the link speed control unit 42*c* performs nothing to keep the link speed settings.

Meanwhile, when the STP circumstance flag is not ON (Step S15: No), it indicates that the network NW is not in the circumstance of executing the STP. Accordingly, a process (a link speed raising process) of raising the link speed is performed (Step S17), and the process proceeds to Step S10. In the embodiment, in the link speed raising process, when each link speed setting is a setting capable of raising the link speed between the printer 4 and the switch 2, the link speed control unit 42*c* raises the link speed. As described above, by raising the link speed, it is possible to rapidly perform communication.

The invention has been described above with reference to the embodiment, but the invention is not limited to the above-described embodiment, and may be applied to various aspects.

For example, in the embodiment, the link speed control unit 42*c* sets the link speed to the lowest link speed communicable between the printer 4 and the switch 2 when the link speed is lowered, but the invention is not limited thereto, and a link speed lower than the link speed used at that time point is satisfactory. For example, as shown in FIG. 3, when the link speed settings in the printer 4 are automatic settings of up to 1000 Mbps and the link speed settings of the connected switch 2 are automatic settings of up to 1000 Mbps, the link speed may be, for example, half fixing of 100 Mbps.

In the embodiment, the printer has been described as an example of the communication device, but the communication device is not limited thereto, the communication device may be, for example, a PC, a scanner, a projector, or the like, and the main point is that it may be a communication device connected to the network and capable of communicating.

The entire disclosure of Japanese Patent Application No. 2010-106393, filed May 6, 2010 is expressly incorporated by reference herein.

What is claimed is:

1. A communication device connected to a network access device constituting a network and capable of communication through the network, comprising:

a circumstance determining unit that determines whether or not the network is in a circumstance of executing a protocol causing blocking of communication on the network by changing the link speed to the network access device;

a power saving determining unit that determines whether or not a predetermined power saving performance condition is satisfied; and a link speed control unit that maintains the link speed when it is determined that the power saving performance condition is satisfied and when the network is in the circumstance of executing the protocol.

2. The communication device according to claim 1, wherein the circumstance determining unit determines whether or not the network is in the circumstance of executing the protocol causing blocking of communication on the network due to changing the link speed to the network access device on the basis of the time until receiving a response from a DHCP server after accessing the network.

3. The communication device according to claim 2, wherein the circumstance determining unit determines that the network is in the circumstance of executing the protocol causing blocking of communication on the network due to changing the link speed to the network access device when the time until the response is received from the DHCP server is longer than 30 seconds.

4. The communication device according to claim 1, wherein the link speed control unit lowers the link speed when the power saving performance condition is satisfied and when the network is not in the circumstance of executing the protocol.

5. The communication device according to claim 1, wherein the link speed control unit lowers the link speed to the lowest link speed of the available link speeds in the network access device.

6. The communication device according to claim 5, further comprising a release determining unit that determines whether or not a situation coinciding with a predetermined power saving release condition occurs,
wherein the link speed control unit raises the lowered link speed when it is determined that the situation coinciding with the power saving release condition occurs.

7. The communication device according to claim 1, wherein the protocol is STP (Spanning Tree Protocol).

8. A communication control method of a communication device connected to a network access device constituting a network and capable of communication through the network, comprising:
determining whether or not the network is in a circumstance of executing a protocol causing blocking of communication on the network by changing the link speed to the network access device;
determining whether or not a predetermined power saving performance condition is satisfied; and
maintaining the link speed when it is determined that the power saving performance condition is satisfied and when the network is in the circumstance of executing the protocol.

* * * * *